UNITED STATES PATENT OFFICE.

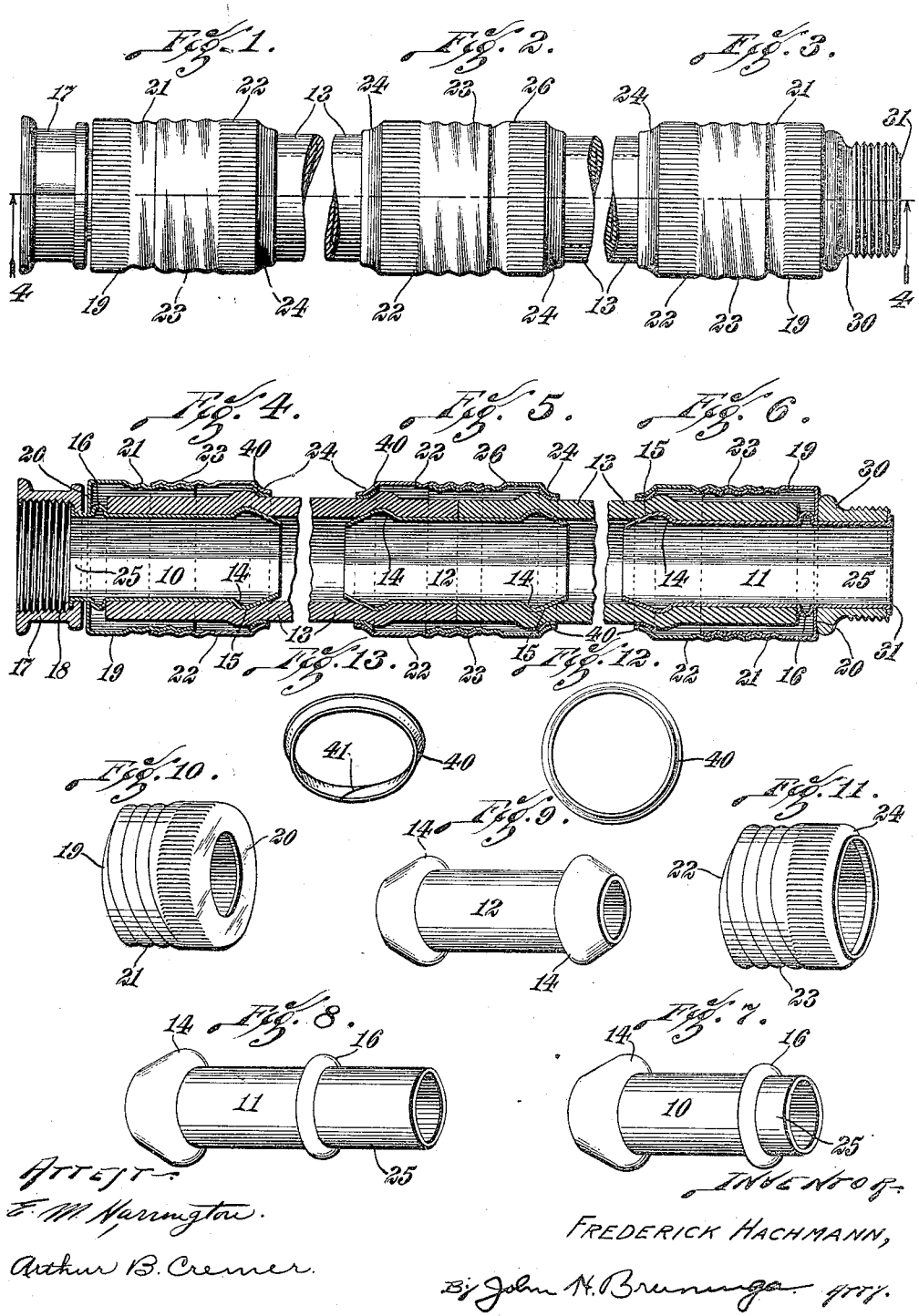
F. HACHMANN.
HOSE COUPLING.
APPLICATION FILED MAR. 13, 1915.
1,204,352. Patented Nov. 7, 1916.

FREDERICK HACHMANN, OF ST. LOUIS, MISSOURI, ASSIGNOR OF ONE-FOURTH TO FRED C. SCHOENTHALER, OF ST. LOUIS, MISSOURI.

HOSE-COUPLING.

1,204,352.   Specification of Letters Patent.   Patented Nov. 7, 1916.

Application filed March 13, 1915. Serial No. 14,278.

*To all whom it may concern:*

Be it known that I, FREDERICK HACHMANN, a citizen of the United States, and residing at St. Louis, in the State of Missouri, have invented a certain new and useful Improvement in Hose-Couplings, of which the following is a specification.

This invention relates to hose couplings, and more particularly, to couplings for rubber or other flexible hose.

One of the objects of this invention is to provide a hose coupling which can be used as a mender, as a coupling to connect two sections of hose, to connect the hose to a source of supply, and which can be used to form a connection for a nozzle.

Another object is to provide a hose coupling which forms a tight joint, which will not tear the hose, and which is devoid of projecting parts.

Rubber and more particularly wire wrapped hose, varies in thickness and, therefore, in diameter. It is, therefore, difficult to design a coupling which will fit every hose of standard internal diameter.

Another object of this invention, therefore, is to provide a hose coupling which will fit all hose of a certain standard inside diameter, even though the thickness of the hose varies within wide limits.

Another object is to provide a hose coupling which is simple in its construction and operation, in which some of the parts are duplicated for the various types of couplings, which is effective in its action, and is cheap to manufacture.

Further objects will appear from the detail description taken in connection with the accompanying drawing, in which:

Figures 1, 2 and 3 are side elevations of three different types of hose couplings embodying this invention; Figs. 4, 5 and 6 are longitudinal sections through the hose couplings shown in Figs. 1, 2 and 3 respectively, the sections being taken along the lines 4—6, Figs. 1, 2 and 3; Figs. 7, 8 and 9 are detail perspective views of the nipples shown in Figs. 4, 5 and 6 respectively; Fig. 10 is a detail perspective of one of the sleeves of the couplings shown in Figs. 4 and 6; Fig. 11 is a detail perspective of the other sleeve, as well as that shown in Fig. 5, Fig. 12 is an end view of one of the liner rings, and Fig. 13 is a perspective view of another form of liner ring.

Referring to the accompanying drawing, 10, 11 and 12 designate nipples adapted to be inserted into the ends of the hose shown at 13. The nipples 10 and 11 have each an annular shoulder 14 rising abruptly from the nipple body and tapering to a smaller diameter at the end, while the nipple 12 has such an annular shoulder at each end. Each of the nipples is adapted to be inserted into a hose, and, when so inserted, forms an annular enlargement 15 on the hose. Each one of the nipples 10 and 11 has formed thereon an annular rib 16. The end 25 of the nipple is adapted to be inserted in and secured to a suitable end connection.

In Figs. 1 and 4, the end connection 17 is internally threaded, has an aperture in its end of smaller diameter than the diameter of the thread, thereby forming a shoulder, and the end 25 of the nipple is turned or flanged over against this shoulder, as shown at 18. In the coupling shown in Figs. 3 and 6, the end connection 30 is externally threaded, the diameter of the thread being the same as that of the end connection 17, but the end 25 of the nipple 11 is, in this case, lengthened to extend entirely through the connecting member, and is turned or flanged over the extreme end thereof, as shown at 31. A sleeve 19 has an end flange 20, which is apertured to pass over the end 25 of either nipple, and is retained on the nipple by and between the rib 16 and the end connection. In the coupling shown in Figs. 1 and 4, the distance between the end connection and the rib is sufficient to permit the end connection 17 to rotate freely on the nipple, so as to form a union joint.

In the coupling shown in Figs. 3 and 6, however, the end flange 20 is firmly clamped between the ribs 16 and the end connection 30, so as to firmly clamp and secure the nipple, sleeve and end connection together. The sleeve 19 is threaded to receive a threaded clamping sleeve 22, the threads 21 and 23 on the sleeves being rolled on in a manner well known to those skilled in the art. The clamping sleeve 22 has an inwardly projecting flange 24, which flares and terminates parallel to the axis, as clearly shown in Figs. 4 and 6, so as to cooperate with the annular enlargement 15 to firmly clamp the hose on the nipple.

In the coupling shown in Figs. 2 and 5, the sleeve 19 is replaced by a clamping sleeve 26 of the same diameter as the sleeve 19, but the radial flange 20 is, in this case replaced by the flared clamping flange 24, as on the clamping sleeve 22. This embodiment of the invention forms a mender adapted to repair a broken hose.

The sleeves 19, 22 and 26 are knurled, as shown in Figs. 1, 2, 3, 10, and 11, and the sleeves, as well as the nipples, are made of sheet metal formed by suitable dies, while the end connections 17 and 30 are preferably formed by casting, but may also be formed by suitable dies. The sleeves, as well as the nipples, are formed by drawing operations. It will, therefore, be seen that the same drawing and expanding dies and tools may be used for the nipples. The same drawing and forming dies may also be used for the clamping sleeves 22. In the formation of both sleeves 19 and 26, the metal is first drawn from a sheet to the form of a thimble, as shown in Fig. 10, omitting the perforation, the thread and the knurl. To form the sleeve 19, the end is now perforated. To form the sleeve 26, however, the end is perforated as well as flared to form the flange 24. The threading and knurling operations are, however, the same on both. It will, therefore, be seen that this coupling is so constructed as to provide for the formation of the four necessary hose connection parts, namely, the end connection, the end couplings, the mender and the union.

To apply the end coupling to a hose, the clamping sleeve 22 is first slipped over the end of the hose for some distance back, and the nipple is then inserted into the end of the hose, so as to form the annular enlargements 15 thereon. The clamping sleeve is now brought up to the threaded end of the sleeve 19 and screwed up tight. This will cause the clamping shoulder or flange 24 to bear against the annular enlargement and firmly clamp the hose against the annular shoulder 15, so as to form a tight joint. To apply the mender, both sleeves are slipped back on the ends of the hose to be joined, the nipple is inserted into the ends, and the sleeves screwed up tight. This will cause the end flanges 24 to clamp the hose against both shoulders of the nipple and firmly clamp both hose sections on the nipple.

It will be noted that when the coupling is applied for use the sleeves 22 are free from contact with the surface of the hose except at the points where the flanges 24 clampingly engage the annular enlargements 15, and as the sleeves have pressed threads forming a yieldable connection between them, a slight transverse movement or play of the sleeves relatively is allowed, thus adapting the device to conform readily to inequalities in thickness, appearing in the hose.

The clamping sleeve 22 or 26 acts to form a tight joint by clamping the hose against the shoulder on the nipple. Since the hose is expansible and compressible to a considerable extent, a single combination nipple and clamping sleeve can be designed for application to a good many thicknesses or plies of hose of a given internal diameter. There are, however, some extra heavy qualities of hose used for which such a given combination is not adapted. In accordance with this invention, therefore, the combination is adapted for and the clamping sleeves are made large enough to take over this extra heavy hose. Now in order to adapt the combination for the lighter hose, each coupling is furnished with one or a pair of rings or liners 40, which are of a cross section to follow the flange 24, to form liners. These liners are of a diameter and thickness to take over the lighter hose of a given diameter. The liners may be solid as shown in Fig. 12, but are preferably split diagonally as shown at 41 in Fig. 13. When split they are compressible so as to contract when clamped against the nipple shoulders. This form is especially useful since it is adaptable to hose of varying diameters.

The application will be obvious from the above. When the combination is to be used on a light or medium hose, the liners are dropped in the clamping sleeves against the flanges 24, and applied as described above. When the combination is to be used on a heavy hose, the liners are omitted.

The coupling shown in Figs. 1 and 4 is adapted to form a suitable connection to a source of supply, such as a hydrant having an externally threaded connecting member, while the coupling shown in Figs. 3 and 6 is adapted to make a connection to a nozzle or other internally threaded member. The two couplings, on the other hand, may be joined together, and, in such case, will form a swivel connection between a pair of hose sections. This swivel connection is desirable where long lengths of hose are used, since, otherwise, twisting of the hose is liable to cause damage thereto. The coupling shown in Figs. 2 and 5 forms a mender for mending a broken or damaged hose section.

The coupling thus constructed forms a fluid tight joint, since the hose forms its own gasket. Moreover, the application of this coupling does not tear or otherwise damage the hose, since the joint is made by smooth shoulders which merely clamp the hose therebetween. The device is, furthermore, simple in construction as well as operation, and is entirely devoid of projecting parts.

The coupling has, furthermore, a universal application, since a single set of coupling members can be used to form together a union or coupling between two hose sections, and they can be used individually to make all the necessary end connections of the hose. Furthermore, certain elements are duplicated throughout the different types of couplings, thereby reducing the number of different parts required to be manufactured or kept on hand for a complete set of couplings. The arrangement of the sleeve 19, which surrounds the nipple, reduces the necessary length of the clamping sleeve 22, as it allows the hose to be inserted between the nipple and the sleeve 19. It will be understood, that, with a coupling of this type, best results are obtained if the end of the hose extends some distance over the shoulder 14.

It is obvious that various changes may be made in details of construction without departing from the spirit of this invention, and it is, therefore, to be understood that this invention is not to be limited to the specific construction shown and described.

Having thus described the invention what is claimed is:

1. A hose coupling comprising a nipple having an enlarged annular shoulder tapering toward the end of the nipple to the internal diameter of the hose and adapted, when inserted into the hose, to expand the latter to form a distinct annular enlargement at a restricted point wholly remote from the coupled end of the hose and permit the hose to contract into engagement with the nipple and shoulder behind the latter, a pressed metal sleeve adapted to be applied over the hose and loosely over the enlargement thereon and having an annular flange formed to present an abrupt shoulder disposed to engage beyond and coact with the outer face of said annular enlargement to clamp the hose against the shoulder on the nipple, and a second pressed metal sleeve arranged for coöperation with the first named sleeve and with the nipple, said sleeves being free from contact with the hose except at said clamping point and having pressed threads forming a yieldable adjusting connection between them and adapting said first named sleeve and nipple to yieldingly clamp the hose and allow slight transverse movement or play of the sleeves relatively.

2. A hose mender comprising a nipple provided adjacent its ends with enlarged annular shoulders tapering toward the ends of the nipple to the internal diameter of the hose and adapted, when inserted into the hose sections, to expand the latter to form distinct annular enlargements at restricted points wholly remote from the meeting ends of said hose sections and permit the hose to contract into engagement with the nipple and shoulders behind the latter, a pair of pressed metal sleeves adapted to be applied over the hose and loosely over the enlargements thereon and having annular flanges formed to present abrupt shoulders disposed to engage beyond and coact with the outer faces of said annular enlargements to clamp the hose against the shoulders on the nipple, said sleeves being free from contact with the hose except at said clamping points and having pressed threads forming a yieldable connection between them and adapting said sleeves and nipple to yieldingly clamp the hose and allow slight transverse movement or play of the sleeves relatively.

3. A hose coupling comprising a nipple having an annular shoulder and adapted to be inserted into a hose, a sleeve adapted to be applied over the hose and having a flange formed and arranged to coöperate with said shoulder to clamp the hose on said nipple, and a split liner conforming to and applied against said flange, adapting the same to hose of different thicknesses.

In testimony whereof I affix my signature in the presence of these two witnesses.

FREDERICK HACHMANN.

Witnesses:
  JOHN A. DOWDALL,
  ARTHUR B. CREMER.

Copies of this patent may be obtained for five cents each, by addressing the "Commissioner of Patents, Washington, D. C."